G. F. VAN DVENTER.

HOODED TROLLEY TRACK AND BRACKET.

APPLICATION FILED SEPT. 12, 1917.

Reissued Dec. 16, 1919.

14,772.

Witnesses:
George C. Schultz
F. M. Davis.

Inventor,
George F. Van Dventer,
By
Rummler & Rummler, Attys.

UNITED STATES PATENT OFFICE.

GEORGE F. VAN DVENTER, OF AURORA, ILLINOIS.

HOODED TROLLEY-TRACK AND BRACKET.

14,772. Specification of Reissued Letters Patent. Reissued Dec. 16, 1919.

Original No. 1,215,084, dated February 6, 1917, Serial No. 73,794, filed January 24, 1916. Application for reissue filed September 12, 1917. Serial No. 191,049.

*To all whom it may concern:*

Be it known that I, GEORGE F. VAN DVENTER, a citizen of the United States, and a resident of the city of Aurora, county of Kane, and State of Illinois, have invented certain new and useful Improvements in Hooded Trolley-Tracks and Brackets, of which the following is a specification.

My invention relates to a trolley track for barn doors and similar structures and particularly to a track that is so hooded that atmospheric elements, such as rain, sleet and snow may be excluded from the interior of the structure and the tread of the track, and which is also provided with means whereby birds and other small animals may be prevented from entering. The principal object of my invention is to so improve the general shape, construction and manner of erecting the track that it is neat in appearance, effective in its operation, and strong and durable in construction. It is also an object of my invention to form a trolley track that is preferably shaped or bent from a flat, elongated strip of metal, with as few parts as possible, and secured together in a simple manner. It is also an object of my invention to provide a track upon which a double roller truck of a barn door trolley may readily operate.

I desire to accomplish the above objects and such other objects as my invention may embody, by the means and in the manner hereinafter fully described and as more particularly pointed out in the claims, reference being had to the accompanying drawings forming a part of this specification, in which similar reference characters are employed to indicate the same parts in the divers figures.

In the drawings,—

Figure 2:
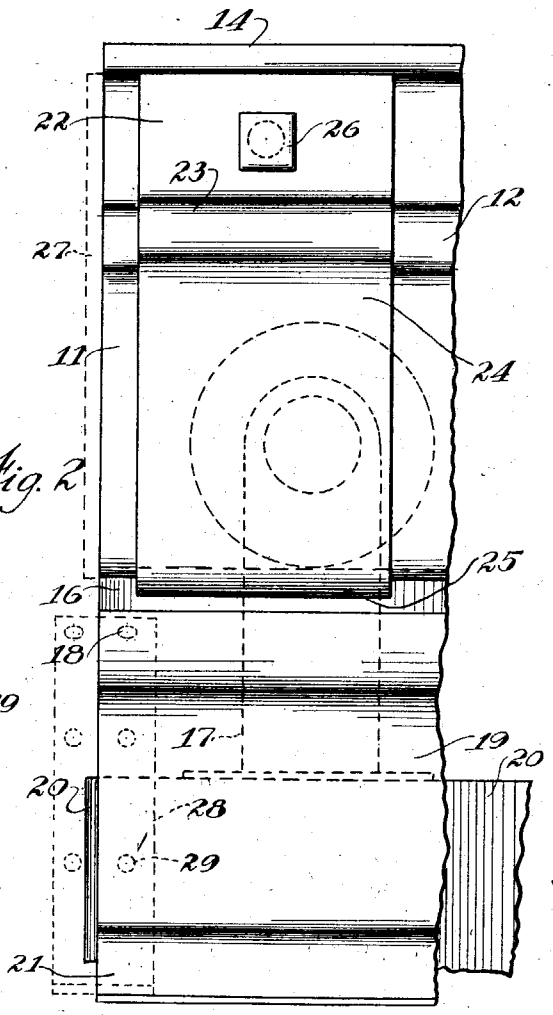
Fig. 2 is a front elevation of a fragmentary portion of the same.
Figure 1:
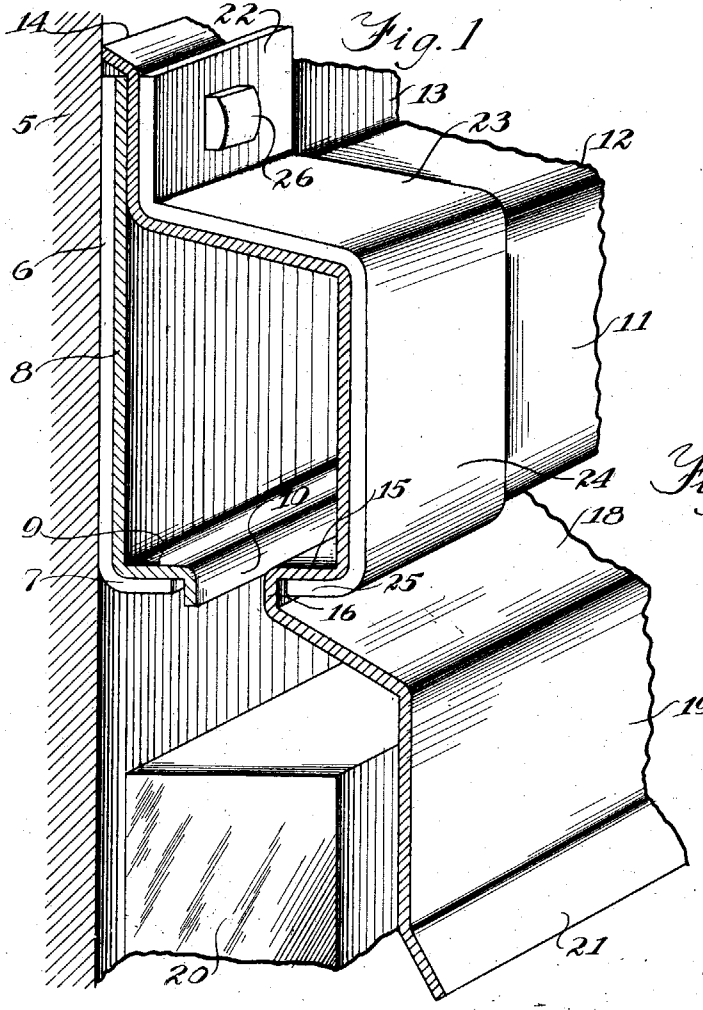
Figure 1 is a perspective view of a fragmentary portion of my improved hooded trolley track and bracket, the end of the track being illustrated in section.

Referring to the drawings, 5 designates the front wall or outer sheathing of the building or other structure upon which my invention is adapted to be installed. Fitted flush against this sheathing, 5, is the inner plate, 6, of one member of the bracket, that has its lower longitudinal edge, 7, bent laterally at right angles to itself and extended in an outward direction to form a ledge or shelf, upon which the inner wall of the trolley track and hood is adapted to be supported.

The inner wall of the trolley track and hood comprises preferably an elongated strip of metal placed in a vertical plane parallel with the wall of the building and comprises an upright or vertically disposed member, 8, the lower edge whereof is bent laterally at about right angles to itself to form the tread, 9, of the inner track. The tread, 9, just referred to, is of a width slightly greater than that of the lateral member of the bracket and has its outer portion bent downwardly to form an apron, 10.

The outer member of the trolley track and hood preferably comprises an elongated strip of metal, of the same gage as the above described inner member, but of considerably greater width. The body portion of this outer member comprises a vertically disposed wall, 11, corresponding with and parallel to, the vertical wall, 8, of the inner member, the top whereof is bent laterally to provide an inclined, rearwardly extended hood or protective guard, 12, that extends back to the vertical wall, 8, of the inner track member, where the said protective guard is bent upwardly, as shown at 13, so as to be disposed flat against the upper portion of the inner vertical member, 8, and is then bent rearwardly toward the sheathing of the building so as to provide a shed, 14, that is inclined upwardly and rearwardly toward and against the wall of the building to seal the same.

At the lower portion of the wall, 11, the metal of the outer member of the track is bent at substantially right angles thereto in an inwardly direction to form the outer tread, 15, of the track that is disposed substantially in the same horizontal plane as the inner tread, 9, and is of substantially the same width thereas. The edge of this tread is bent downwardly a slight distance to form a vertically disposed apron, 16, corresponding with apron, 10, of the opposite track and spaced therefrom a distance sufficient to permit the pendant member, 17, of the trolley to move or be guided between said treads. Below this apron, 16, the metal strip is bent in a downwardly and outwardly inclined direction to form a roof, 18, over the door so as to shed water therefrom and its outer edge is bent downwardly to form a vertical wall, 19, disposed parallel with the door in a vertical plane a distance from the wall of the building to permit a door, 20, of ordinary width, to freely move therebetween. The lower edge of the lower wall, 19, is bent outwardly in a downwardly inclined direction to provide a drip or eave, 21, that is adapted to shed the rain or similar moisture, beyond the door and its mounting.

From the above it will be observed that the double track is practically closed against moisture, such as rain, sleet and the like, by means of the vertical walls, 8 and 11, and the hood, 12. The tracks are spaced apart sufficiently to permit the pendant member of the door hanger to freely travel its course through the narrow slot, and the door itself, adjacent its upper edge, is protected against atmospheric elements by the inclined roof and wall, 18 and 19. It will also be observed that this construction successfully prevents sparrows, and other small animals, from having access to the track and upper portion of the door so that they may not nest therein or cause derailment of the truck or clogging of the track.

In order to secure the outer track and hood member in position, I have provided an outer bracket that preferably comprises a relatively narrow, vertically elongated strip of metal, the upper vertical portion, 22, whereof lies flat against the portion, 13, of the outer track member and corresponds in height therewith. The bracket member is bent outwardly and downwardly, as shown at 23, to fit over the inclined roof, 12, and then downwardly, as shown at 24, to fit the outer wall, 11. The lower edge of the bracket member is bent inwardly at substantially right angles to the vertical member, 24, to provide a shelf or ledge, 25, that fits under and supports the outer track, 15. I prefer to secure the two track members together by means of suitable bolts, rivets or swaging, and at suitable distances apart, I mount the two bracket members thereon and secure the whole structure to the barn wall by means of bolts, 26, that extend through the superimposed portions of these elements.

While I have described and shown the track and hood members, as well as the lower door-protecting walls made of a single strip of flat metal bent into the proper shape, it, of course, will be obvious to others skilled in the art of door-hangers and tracks of this type, that these divers walls and roofs may be constructed of separate strips and either bolted, riveted or swaged together. Therefore, I do not wish it understood that I herein limit myself to a track and hood made of a single strip of metal in the structure as contemplated within the scope of my invention as expressed in the appended claims.

When the track is made in sections it is desirable to connect the abutting ends by means of metal straps, 28, connecting and bridging the two abutting track sections, said straps being preferably riveted at 29 to the sections, as shown in dotted lines (Fig. 2).

In order to further seal the track against invasion by birds and other small animals, I prefer to close the ends thereof by securing suitable transverse end-plates, 27, to the open ends of the track, as shown in dotted lines in Fig. 2.

What I claim as new is:—

1. A door hanger trolley track, comprising a housing consisting of an inner and an outer oppositely disposed member each terminating at their lower ends in a track member, an apron depending from the outer track portion, and a roof extending upwardly and inwardly from the upper end of the outer track member, the upper ends of said members being disposed in juxta vertical planes, a series of supporting brackets consisting each of two members conforming to the configuration of the housing with their lower ends spaced and under the housing while their upper ends are in juxta vertical planes relatively to each other and to the upper ends of the housing members, whereby a single bolt may secure the upper ends of the housing and bracket members together and to a support at a given point.

2. In a door hanger trolley track, the combination with a section of track consisting of a wall plate having a laterally bent lower portion adapted to form the tread of the track, of a second section of track comprising a length of sheet metal bent to provide a roof above said first named track section, a vertical wall continuous from said roof the lower portion of which is bent laterally inward to provide a track tread opposite said first mentioned tread, the remaining portion of said length of metal inclined downwardly and outwardly from said track tread, brackets conforming to the configuration of the track members with their tops adjacent to the tops of the track members whereby a single bolt may secure the upper ends of the track members and brackets together and to a support at a given point.

3. A door hanger trolley track, comprising a housing, having a slot extending along the lower part thereof and a track part within said housing extending along the slot, an apron extending downwardly and outwardly from said track, said housing having a supporting extension at the upper part, and a bracket having a part extending under and supporting the housing, and having a part near said upward extension whereby a single bolt passing through both may secure them together and to a support.

4. A door hanger trolley track, comprising a pair of complementary wall members each adapted to be rolled from sheet metal, said members being formed and adapted for fastening together detachably at or adjacent to their upper edges in weather-excluding relation to each other, their lower edges being turned inward and terminating in spaced relation and constituting a pair of parallel roller treads for the door-trolley hanger, said members having their whole inner faces respectively turned generally toward each other and their outer faces correspondingly away from each other.

5. A knock-down slotted door hanger of weather-proof hollow character, the several parts of which are adapted for nesting with the corresponding parts respectively of other like devices, said hanger comprising complementary front and rear wall members which fit together tightly at the top and which have inwardly turned lower parts relatively spaced horizontally and formed to serve as trolley trackways bordering on each side of the slot.

6. A door hanger trolley track member formed and adapted to be rolled from sheet metal and comprising a medial wall part and divergently flaring roof and bottom parts contiguous with the edges thereof respectively, and a protecting flange extending obliquely downward and outward from the inner edge of said bottom part for deflecting the elements, said bottom part being adapted to serve as a roller tread, in combination with a complementary track member also formed and adapted to be rolled from sheet metal and comprising a medial wall part, an upper edge part formed and adapted for securing to the upper part of the first-mentioned track member, and a bottom part turned inward and adapted to serve as a roller tread opposite the first-mentioned tread.

GEORGE F. VAN DVENTER.